United States Patent [19]
Zurcher et al.

[11] Patent Number: 5,040,743
[45] Date of Patent: Aug. 20, 1991

[54] SPINNING REEL WITH REAR-ACTUATED FRONT DRAG

[75] Inventors: John A. Zurcher; John W. Chapman; Steven M. Tipton, all of Tulsa; Richard J. Feehan, Pawnee, all of Okla.

[73] Assignee: Zebco Corporation, Tulsa, Okla.

[21] Appl. No.: 509,326

[22] Filed: Apr. 16, 1990

[51] Int. Cl.⁵ .................... A01K 89/027; A01K 89/01
[52] U.S. Cl. .................................................. 242/246
[58] Field of Search ........................ 242/244, 245, 246

[56] References Cited

U.S. PATENT DOCUMENTS

| | | | |
|---|---|---|---|
| 3,144,217 | 8/1957 | Wood, Jr. | 242/248 |
| 3,322,371 | 5/1967 | Rouanet | 242/244 |
| 3,948,465 | 4/1976 | Scusa | 242/264 |
| 4,416,427 | 11/1983 | Kawai | 242/244 |
| 4,634,073 | 1/1987 | Coquelet | 242/245 |
| 4,696,437 | 9/1987 | Yoshikawa | 242/244 |
| 4,749,285 | 7/1988 | Noda | 242/244 |
| 4,756,487 | 7/1988 | Hagashi | 242/244 |
| 4,778,120 | 10/1988 | Finney et al. | 242/244 |
| 4,778,123 | 10/1988 | Yoshikawa | 242/244 |

Primary Examiner—Daniel P. Stodola
Assistant Examiner—Justin Shriver
Attorney, Agent, or Firm—Wood, Phillips, Mason, Recktenwald & Van Santen

[57] ABSTRACT

A spinning-type fishing reel is provided with a rear-actuated front drag. Concentric shafts are provided with a spool freely rotatable on one shaft. Drag members operate on the spool to provide drag to the spool. A drag knob on the rear of the reel operates on one of the shafts to shift the one shaft axially relative to the other, thereby applying pressure to the drag members and to the spool to increase the drag on the spool. In one form, the spool may be freely rotatable on a spool carrier which is keyed to one of the shafts. A spool cap attached to one of the shafts operates through the drag members to apply drag to the spool. The spool is urged against an abutment carried by the other shaft such that moving one shaft relative to the other by turning the rear-mounted drag knob either increases or decreases the drag on the spool.

14 Claims, 3 Drawing Sheets 5,040,743

SPINNING REEL WITH REAR-ACTUATED FRONT DRAG

TECHNICAL FIELD

This invention relates to spinning-type fishing reels and, more particularly, to a rear-actuated front drag structure for such reels.

BACKGROUND ART

Traditionally, spinning-type or open face-type fishing reels have had structures for adjusting the drag on the spool located forward of the spool. The adjustment was accomplished by turning a spool cap which applied increased or reduced pressure on the spool. To effect the drag adjustment, the fisherman had to hold the rod and reel in one hand and use the other hand to reach forward of the spool and turn the cap. This procedure was awkward, interfered with the control of the rod, reel and line usually at a critical point in the fish-catching or fishlanding process, and cost time in setting the hook, or the like, that could result in losing the fish.

To overcome these problems, rear drags with rear actuators were developed, whereby a drag actuator knob was located rearward of the reel housing with a drag structure acting on the rear portion of the centershaft so that as the drag was applied to the centershaft, the rotation of the spool under line tension was retarded. The rear actuated drag was a great step forward in convenience and accessibility for adjusting the drag before, during and after a cast, but it was found that applying the drag to the rear portion of the centershaft was less than efficient and effective in setting the drag accurately.

Still a third structure for applying drag to a spinning reel was a drag applied to the rotor. A control acting through the housing, applied drag to the rotor so that line being wound on the spool over the roller on the bail was resisted by the resistance to rotation of the rotor.

SUMMARY OF THE INVENTION

The present invention overcomes the problems associated with the prior drag applying structures and takes advantage of the favorable features of each. A drag applying structure is provided whereby the drag is applied directly to the spool at the front of the reel taking advantage of the early front applying drag structures. The drag is adjusted by manipulating an actuator at the rear of the reel taking advantage of the rear drag adjustment structure. The result is a reel having a rear-actuated front drag whereby the drag knob at the rear of the reel is turned to transmit forces through the centershaft to apply drag pressure to the spool at the front of the reel.

The structure in one preferred form has a pair of concentric members (i.e. a centershaft and a tubular shaft concentrically disposed with respect to the centershaft). One shaft has limited axial movement relative to the other shaft, with both shafts being constrained against rotational movement. The two shafts are mounted with respect to drag members acting against the spool such that manipulating a drag actuator on the rear of the housing creates movement of one shaft axially relative to the other, which will increase or decrease the drag applied to the spool.

The convenience of a rear drag actuation structure coupled with a direct application of drag to a spool creates an improved spinning reel with an accurate and efficient drag applied by manipulating a drag actuator conveniently and efficiently located at a convenient position on the reel.

BEST MODE FOR CARRYING OUT THE INVENTION

Figures 1, 2:
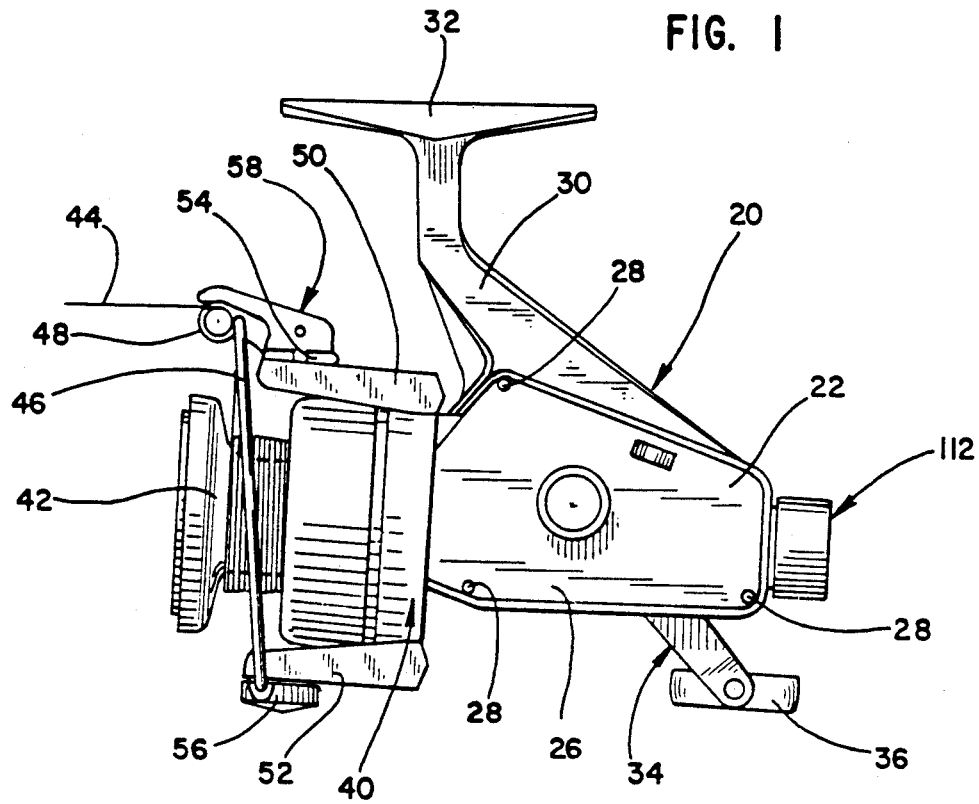
FIG. 1 is a side elevational view of a spinning style fishing reel embodying the improved rear-actuated front drag.
FIG. 2 is a vertical cross-sectional view of the reel of FIG. 1 showing the operative elements of the invention.

In the exemplary embodiment of the invention, a spinning reel 20 has a housing 22, which includes an internal gear case 24 (FIG. 2), over the opening of which is secured a cover 26 as by screws 28. The reel has a stem 30 which connects the housing to a shoe or foot 32. The shoe or foot 32 is used to connect the reel to a fishing rod. A crank assembly 34 includes a crank handle 36 connected to a crankshaft 38 which extends into the gear case 24 in the housing. As is well known in the art, the handle 36 may be disposed on the other side of the housing for accommodating the personal desires of the fisherman.

An axially mounted rotor 40 is provided and is adapted to be rotated about the axis of a spool 42 as the crank 36 is turned for line retrieval. Fishing line 44 is captured by a bail 46 as it passes over line guide 48 and is wound on the spool. The rotor has a pair of integrally formed, forwardly extending bail ears 50,52 to which are pivotally mounted the bail arms 54,56 supporting the opposite ends of the bail 46. A bail opening trigger assembly 58 is pivotally mounted on the bail ear 50 for opening the bail. A typical bail-opening trigger is shown and described in U.S. Pat. No. 4,676,450 in the name of R. Carpenter et al. and assigned to Zebco Corporation, a common assignee of the present application.

Referring to FIG. 2, inside the gear case 24 is a crankshaft gear assembly 60 on the crankshaft 38, which crankshaft 38 is journaled between the side 62 and the cover plate 26. The gear assembly 60 includes a face gear 64 and an oscillator pinion gear 66, shown in phantom in FIG. 2, both keyed to the crankshaft in an axially spaced relationship for rotation when the crankshaft is rotated. The oscillator pinion gear 66 meshes with an oscillator drive gear 68 carried on a stub shaft 69 supported on the housing and which drive gear 68 has a projecting lug 70 engaging in the vertical track 72 in oscillator slider 74. As the crank handle 36 is turned, the pinion gear 66 and drive gear 68 drive the oscillator slider 74 in a back-and-forth oscillating motion, which motion is transmitted to a centershaft 76. It should be understood that there are several alternative structures for converting rotary motion of the crank handle 36 to oscillating motion of a centershaft 76, any one of which can be used with the present inventive structure to be described hereinafter.

Figure 3:
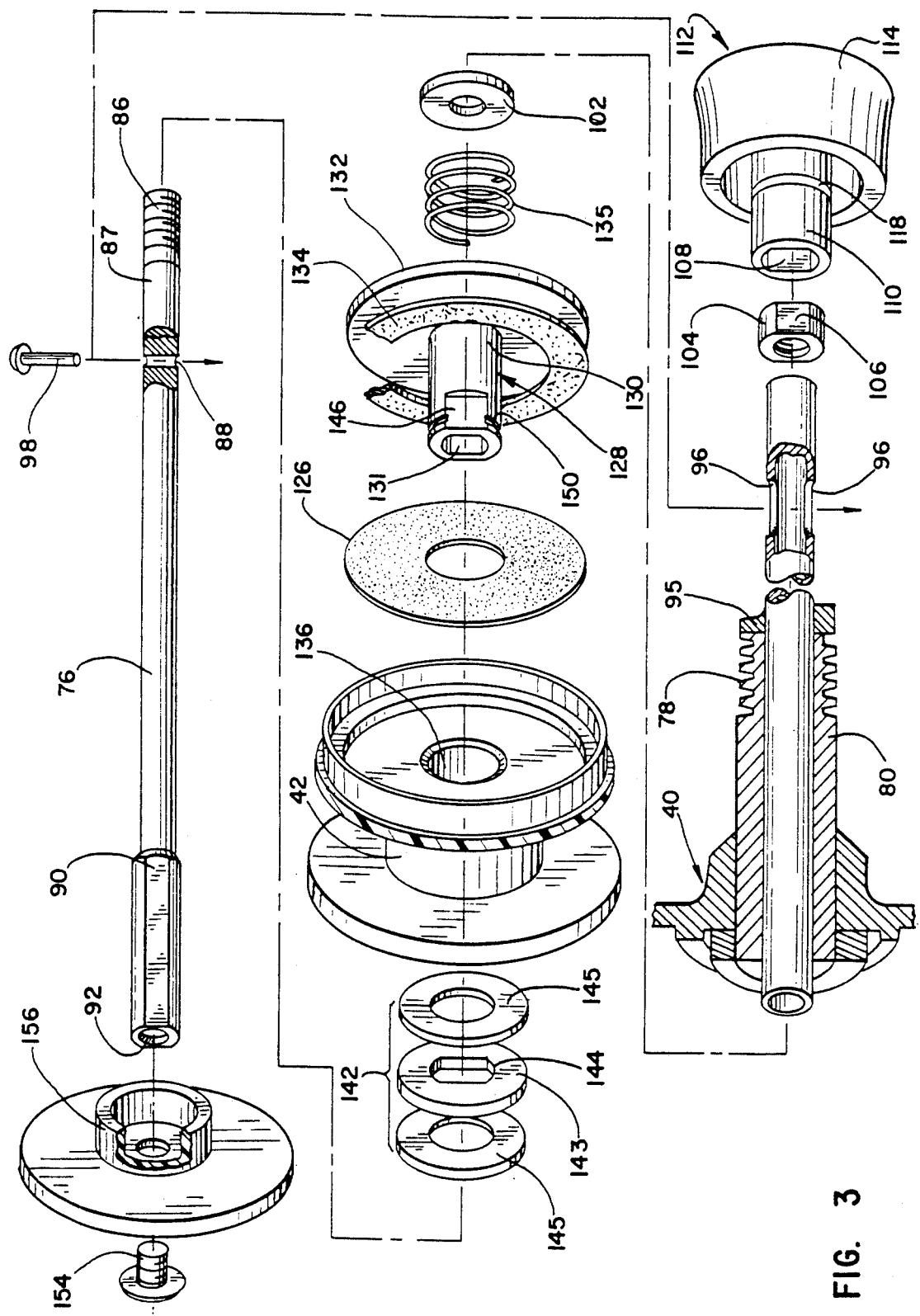
FIG. 3 is a blown-apart enlarged perspective view of the structural parts of the invention.

As shown in FIGS. 2 and 3, the face gear 64 of the gear assembly 60 meshes with a pinion gear 78 fixed on a sleeve 80 journaled for rotation in a bearing 82 (FIG. 2) in an opening in the front wall of the housing 22. The sleeve 80 is attached to the rotor 40 by nut member 84 threaded on the end portion of the sleeve. Rotation of the crank rotates the face gear 64, pinion gear 78, sleeve 80 and rotor 40 in the conventional fashion.

The centershaft 76 has threads 86 at one end portion 87, has a bore 88 extending transverse to its longitudinal axis, which bore is spaced from the threaded portion 87, has an enlarged end portion 90 on the end opposite from the threaded portion 87, which portion 90 has either a D-shaped transverse cross section or has longitudinally oriented splines, and has a threaded bore 92 extending axially in from the end of the end portion 90. A hollow tubular shaft 94, extending through a bore in a boss 95 on the cover plate 62, encircles the centershaft 76 and has a pair of diametrically opposite and axially extending slots 96 aligned with the transverse bore 88 in the centershaft. A pin 98 passes through the bore 88 in the centershaft, through the slots 96 in the tubular shaft 94 and connects with a pair of spaced arms 100 extending outwardly from the oscillator slider 74 whereby oscillating movement of oscillator slider 74 will be transmitted to the centershaft 76 and to the tubular shaft 94. The pin 98 and the slider 74 prevent the centershaft 76 and tubular shaft 94 from rotating either relative to the housing or relative to each other. The slots 96 permit the tubular shaft 94 to move axially or longitudinally a limited amount relative to the centershaft. The tubular shaft 94 has an abutment or flange 102 on one end which is spaced forward of the end of the sleeve 80 and rotor 40 in the rearmost position of the tubular shaft.

A drag-adjusting nut 104 is threaded on the threaded end portion 87 of the centershaft. The nut 104 has a splined or double D cross-sectional shape 106 on its outer surface, which spline or double D configuration slidably mates with a matching spline or double D configuration 108 on the inside surface of a sleeve 110 forming a part of a drag adjustment knob 112. The knob 112 has an enlarged, preferably knurled, outer cylindrically shaped portion 114 which is located exteriorly of the rear part of the reel housing 22. The knob is held assembled with the housing by means of a C clip 116 seating in a continuous groove 118 in the outer surface of the sleeve 110. The clip 116 nests between the inside of the rear wall of the housing and studs 120 projecting from the wall 62 of the housing. The knob 112 can be rotated about its axis and has the adjusting nut 104 sliding axially in the splined or double D-shaped interior, with the nut threaded on the threads 86 on the centershaft. The nut 104 bears against the end of the tubular shaft such that turning of the knob 112 will turn the nut on the threads on the centershaft which moves the centershaft axially relative to the tubular shaft.

The mating splines on the nut 104 and in the knob 112 permits the centershaft 76 and tubular shaft 94 to be oscillated in the housing under the oscillating motion of the oscillator slider 74.

The enlarged and splined end portion 90 of the centershaft supports a spool carrier 128 which includes not only a sleeve portion 130 with an internal spline or D-shaped cross section 131 mating with the spline or D-shaped enlarged end portion 90 of the centershaft but also has a radially flanged portion 132 with a drag-inducing material in the form of a ring-shaped friction disc 134 on the inside surface of the flange. The friction disc 134 is made from a material such as asbestos, or the like. A compression spring 135 encircles the centershaft 76 and bears against the abutment 102 on the tubular shaft 94 and against the spool carrier 128 urging the spool carrier away from the tubular shaft 94.

The spool 42 has a central opening 136 encircling the sleeve 130 of the spool carrier 128. The spool 42 is free to rotate relative to the sleeve 130 on the spool carrier 128 and relative to the centershaft 76. The spool 42 has an axially facing undercut portion 122 on one flange 124 in which undercut portion is disposed a friction ring 126 facing the friction disc 134 on the flange of the spool carrier 128. The ring 126 is composed of metal, and preferably stainless steel. The spool 42 has a second, deeper undercut portion 138 in the spool hub 140 facing opposite the undercut portion 122. A drag stack 142 is seated in the second undercut portion 138 in the spool. The drag stack 142 has a center disc 143 keyed by means of a D-shaped opening 144 in the disc which mates with a D-shaped portion 146 on the end portion of the sleeve 130 of the spool carrier 128. The two outer discs 145 of the drag stack 142 have circular openings so that they can rotate relative to the carrier 128. The drag stack 142 and the spool 42 are held assembled on the spool carrier 128 by means of a C-clip 148 nesting in a groove 150 in the sleeve 130. A spool cap or drag cap 152 is attached to the end of the centershaft 76 by means of a screw 154 being threaded into the threaded end 92 of the centershaft. The cap 152 has an axially directed collar 156 on its inside surface, which collar 156 encircles the end of the spool carrier 128 and bears against the outer friction disc 145 of the drag stack 142.

It can now be seen that to increase the drag on the spool, the adjustment knob 112 is turned in a clockwise direction, whereupon the nut 104 will move the centershaft axially to the right in FIG. 2 pulling the spool cap or drag cap 152 to the right against the drag stack 142, spool 42, friction discs 126,134 to the spool carrier 128 which is pressed against the adjustment spring 135, abutment 102 and the tubular shaft 94. Since the abutment 102 on the tubular shaft 94 does not move, the spring 135 is further compressed between the spool carrier 128 and the abutment, thereby increasing the drag force applied to the spool. Turning the drag knob in the opposite direction (counterclockwise) moves the spool cap to the left, permitting the spring 135 to expand, thereby lessening the force applied between the spool carrier and the friction discs and likewise lessening the drag on the spool. Once the drag is set, the reel operates in the well-known and conventional fashion.

Figure 4:
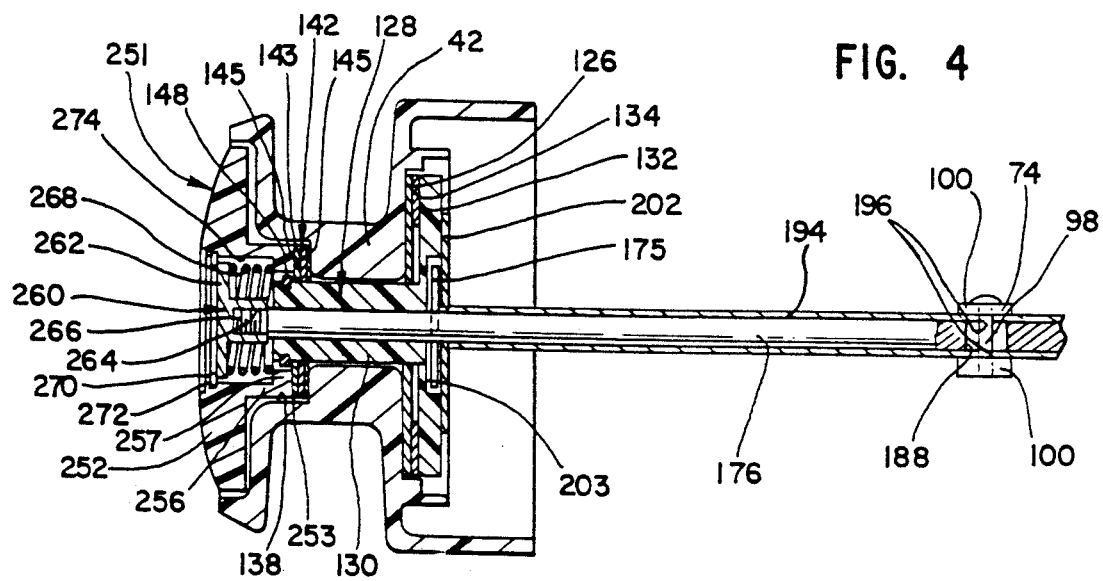
FIG. 4 is a partial cross-sectional view of the front portion of a reel embodying a modified form of the drag portion of the invention.

FIG. 4 shows a modified form of the rear-actuated front drag wherein the centershaft 176 has an elongated slot 188 therethrough while the tubular shaft 194 has a pair of aligned circular openings 196 therethrough in alignment with the slot 188. The pin 98 passes through the openings 196 in the tubular shaft and through the slot 188 in the centershaft for securing the oscillator slider 74 to the centershaft/tubular shaft unit. As before, the centershaft can move axially a limited amount relative to the tubular shaft, but the centershaft and tubular shaft cannot rotate relative to each other.

The tubular shaft 194 has a large diameter abutment, or flange, 202 affixed on its outer end which, when the spool carrier 128 and spool 42 are assembled on the centershaft 176, bears directly against the flange 132 of the spool carrier 128.

The spool carrier 128 has the friction disc 134 facing and contacting the friction ring 126 on the spool 42. The drag stack 142 has the center disc 143 keyed to the spool carrier with the outer discs 145 rotatable about the sleeve 130 of the spool carrier and sandwiching the center disc 143 therebetween. A C-clip 148 nests in the groove in the end of the centershaft to retain the stacked friction discs and spool assembled with the spool carrier as a subassembly which can be removed from and replaced on the centershaft as a unit.

The centershaft 176 has a pin 175 affixed in an aperture in the centershaft and extends above and below the centershaft in a stationary manner. The spool carrier 128 has a vertical slot 203 in the face of the flange 132 into which the pin 175 nests, whereby the spool carrier is fixed relative to the centershaft so that it will not rotate relative to the centershaft. Using this form of keying between the spool carrier and the centershaft makes it possible to eliminate the double D or splining on the end portion of the centershaft.

The spool 42 and spool carrier subassembly are assembled on the end portion of the shaft and are held thereon by a cap assembly 251 which includes a spool cap or drag cap 252. The drag cap 252 has an extended cylindrical hub 256 with an inturned lip 257 at the outer end defining a forward facing end surface 253 bearing against the outer drag disc 145 of the drag stack 142 on the spool and spool carrier subassembly. The cylindrical hub 256 has an outer diameter small enough to fit freely within the undercut portion 138 of the spool 42 and has an inside diameter at the inside of the lip at the front end large enough to pass over the end of the centershaft and over the clip 148. The cap assembly 251 also includes a nut 260 having an enlarged head portion 262 and an internally threaded body portion 264 which is attached to the centershaft 176 by threading the body portion 264 on a threaded end 266 of the centershaft. A compression spring 268 is compressed between the head 262 of the nut 260 and the lip 257 of the cap 252. When the cap assembly 251 is assembled on the centershaft 176, the lip 257 is urged loosely against the drag stack 142 when the drag knob 112 is in the no drag or light drag position, as will be described hereinafter. Drag on the spool is created when the spring 268 urges the lip on the cap 252 against the drag stack 142 and against the spool 42, with the spool being urged against the drag discs 126,134 and the flange 132 of the spool carrier 128. The spool carrier is fixed against rotation relative to the centershaft by the pin 175 in the centershaft. The abutment or flange 202 on the tubular shaft 194 is positioned against the flange 132 on the spool carrier 128. The nut 260 and cap 252 are held together as the cap assembly 251 by an expanding clip 270 seated in a groove 272 in the internal opening 274 in the cap. In this way, the cap 252, nut 260, and spring 268 are retained as a unit and can be removed from the centershaft by unthreading the nut 260 from the centershaft without need for concern that the spring and other parts will fall to the ground. The drag on the spool 42 is adjusted by turning the knob 112 in one direction (clockwise), which will pull the centershaft 176 rearward relative to the tubular shaft 194, thereby pulling the nut 260 and spring 268 closer to the abutment 202 on the tubular shaft which, in turn, increases the pressure on the drag stack 142 and drag discs 126,134, which increases the drag on the spool 42. Turning the drag knob 112 in the opposite direction (counterclockwise) moves the centershaft to the left relative to the tubular shaft, thereby decreasing the drag on the spool.

The form of invention shown in FIG. 4 has the advantage that the cap assembly 251 and spool subassembly can be removed from the reel by unthreading the cap assembly 251 from the centershaft, whereupon a replacement spool subassembly with heavier or lighter line, or the like, can be placed on the reel and the cap assembly can be reattached to the centershaft, whereby the reel is immediately ready for use without need for concern that friction discs or springs or clips will be dropped and/or lost.

Figure 5:
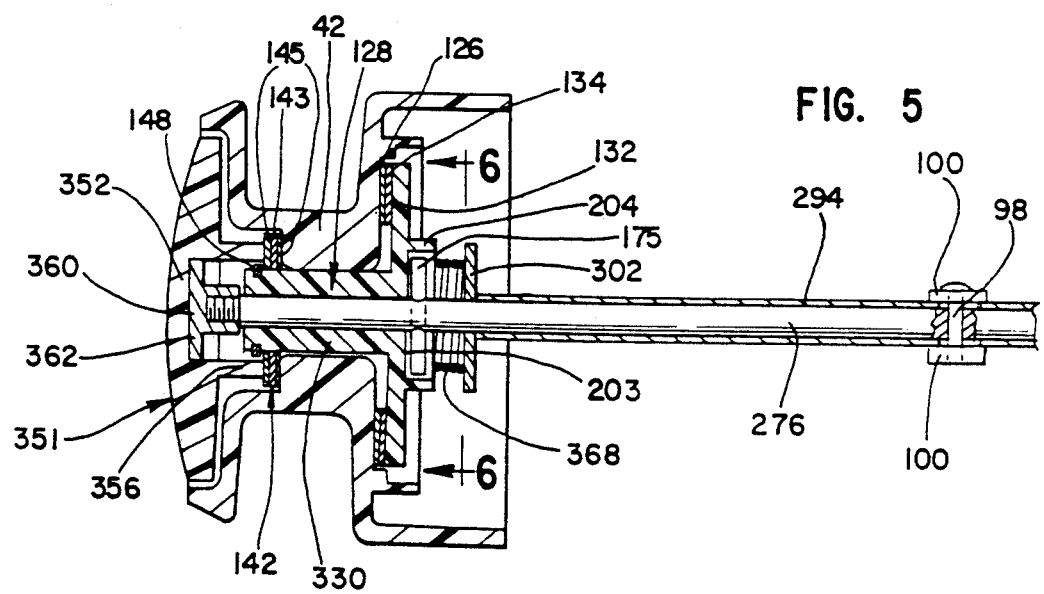
FIG. 5 is a partial cross-sectional view of the front portion of a reel embodying another modified form of the invention.
Figure 6:
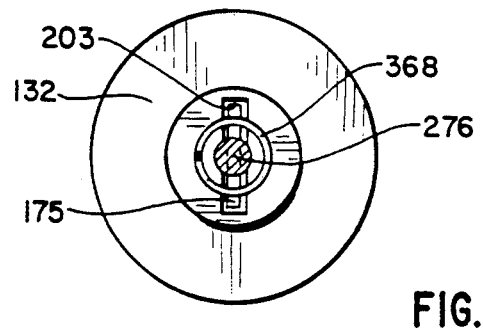
FIG. 6 is a cross-sectional view taken along the line 6—6 of FIG. 5.

FIGS. 5 and 6 show another modified form of the drag assembly wherein the centershaft 276 is pinned to the tubular shaft 294 using a pin 98 in an opening in the centershaft and passing through slots in the tubular shaft 294 the same as in FIGS. 2 and 3, with the pin 98 securing the centershaft/ tubular shaft combination to the oscillator slider 74 (not shown in FIG. 5). The spool subassembly, including the spool 42 and spool carrier 128, has the drag discs 126 and 134, respectively, mounted between the spool flange and the spool carrier flange 132, with the drag stack 142 acting on the opposite flange of the spool. The disc 143 of the stack 142 is keyed to the spool carrier with the discs 145 on either side thereof. A clip 148 retains the spool subassembly assembled.

A fixed crosspin 175 is seated in the centershaft and nests in a vertical slot 203 in the hub 204 on the end of the spool carrier. In this way, as in FIG. 4, the spool carrier is fixed against rotation relative to the centershaft. A cap assembly 351 has a cap 352 and a nut 360 threaded on the end of the centershaft. The nut 360 is embedded in the cap 352. The head 362 on the nut 360 has an irregular outer shape so that when embedded in the cap 352, it will not turn relative to the cap. The cap 352 has a hub 356 extending inwardly in overlapping relationship to the end of the centershaft and to the end of the sleeve 330 of the spool carrier so that the cap abuts against the drag stack 142.

The principal difference between the modification of FIGS. 4 and 5 is the location of the compression spring 368 which, in the FIG. 5 version, is located around the centershaft and between the abutment plate 302 affixed on the end of the tubular shaft 294 and the end face of the hub 204 on the spool carrier. Turning the knob 112 in one direction (clockwise), the centershaft 276 is drawn to the right relative to the tubular shaft to compress the drag discs against both sides of the spool to increase the drag on the spool relative to the spool carrier. Turning the knob 112 in the opposite direction (counterclockwise) will shift the centershaft to the left relative to the tubular shaft, relaxing the pressure on the drag discs and lightening up the drag on the spool.

From the above, it will be clear that an improved spinning reel is provided which has as the novel feature a rear-actuated front drag. The structure affords the fisherman the comfort and convenience of a drag actuator on the rear of the reel which manipulates a drag directly on the spool at the front of the reel. Drags operating directly on the spool have the accuracy and dependability most fishermen desire.

We claim:

1. In a spinning reel for fishing having a housing, a wall on said housing through which a cylindrical member is rotatably extended, a pinion gear affixed to one end of said cylindrical member with the other end being attached to a rotor, a crankshaft in the housing, a crank exterior of the housing connected to the crankshaft, and a face gear on said crankshaft drivingly engaging said pinion gear for rotating the rotor, the improvement comprising:
- a centershaft extending through said cylindrical member and projecting forward of said rotor;
- a tubular member concentric with said centershaft and passing through said cylindrical member;
- a drag-adjusting knob rotatably supported on the rear of said housing and encircling the rear end portions of the centershaft and the tubular member;
- means threaded on the rear end portion of the centershaft and engaging the rear end of said tubular member, said threaded means coacting with said drag-adjusting knob to permit relative axial movement of the threaded means while preventing relative rotational movement between the threaded means and the drag-adjusting knob;
- means acting between said centershaft and said tubular member for preventing relative rotation therebetween while permitting limited relative axial movement therebetween;
- an oscillator slider operatively connected to said acting means and to said crankshaft whereby rotation of said crankshaft oscillates the slider, the tubular member and the centershaft;
- a spool freely rotatable relative to the front end of said centershaft;
- drag means engaging said spool;
- a spool cap secured to said centershaft for retaining said spool and drag means on the centershaft; and
- resilient means acting between the centershaft and the tubular member for urging the drag means against said spool whereby turning the drag knob in one direction will increase the drag pressure between said spool and said drag means and turning said drag-adjusting knob in the other direction will decrease the drag pressure between said spool and said drag means.

2. The spinning reel of claim 1 wherein a spool carrier is splined to said centershaft, and said spool is freely rotatable on said spool carrier.

3. The spinning reel of claim 2 wherein said drag means comprises facing drag discs between a flange on the spool and a flange on the spool carrier, said drag means further comprises a drag stack engaging another flange on the spool with said spool cap urging said drag stack and drag discs against said spool.

4. The spinning reel of claim 3 wherein said resilient means extends between said tubular member and said spool carrier to urge the spool carrier toward the spool cap with the drag discs and drag stack therebetween.

5. The spinning reel of claim 4 wherein said threaded means comprises a nut member threaded on the centershaft and bearing against the tubular shaft and said nut member is splined and mates with a spline in the drag knob whereby turning the knob moves the centershaft axially relative to the tubular member, said spline on the nut member permitting the centershaft and tubular shaft to oscillate relative to the knob.

6. In a spinning reel for fishing having a housing, a wall on said housing through which a cylindrical member is rotatably extended, a pinion gear affixed to one end of said cylindrical member with the other end being attached a rotor, a crankshaft in the housing, a crank exterior of the housing connected to the crankshaft, and a face gear on said crankshaft drivingly engaging said pinion gear for rotating the rotor, the improvement comprising:
- a centershaft extending through said cylindrical member and projecting forward of said rotor;
- a tubular member concentric with said centershaft and passing through said cylindrical member;
- an abutment fixed on the forward end of the tubular member;
- drag-adjusting knob rotatably supported on the rear of said housing and encircling the rear end portions of the centershaft and the tubular member;
- means threaded on the rear end portion of the centershaft and engaging the rear end of said tubular member, said threaded means coacting with said drag-adjusting knob to permit relative axial movement of the threaded means while preventing relative rotational movement between the threaded means and the drag-adjusting knob;
- means acting between said centershaft and said tubular member for preventing relative rotation therebetween while permitting limited relative axial movement therebetween;
- an oscillator slider operatively connected to said acting means and to said crankshaft whereby rotation of said crankshaft oscillates the slider, the tubular means and the centershaft;
- a spool on said centershaft;
- drag means on the centershaft between the spool and said abutment on the tubular member;
- spring means between said abutment means and the drag means; and
- a spool cap secured to said centershaft and retaining said spool on said centershaft against said drag means whereby turning said drag-adjusting knob in one direction will increase the drag pressure between said spool and said drag means and turning said drag-adjusting knob in the other direction will decrease the drag pressure between said spool and said drag means.

7. In a spinning reel for fishing having a housing with a forward wall spaced from a rear wall, a cylindrical member rotatably extending through said forward wall, a pinion gear affixed to one end of the cylindrical member and a rotor attached to the other end thereof, a crankshaft having a crank handle and extending transversely to said cylindrical member, and a face gear on said crankshaft drivingly engaging said pinion gear for rotating the rotor, the improvement comprising:
- a centershaft extending through said housing and through said cylindrical member;
- a tubular member encircling a portion of said centershaft and passing through said cylindrical member with an abutment on the forward end thereof spaced forwardly of said rotor;
- a spool carrier keyed to said centershaft for axial movement relative to the centershaft and rotatable with the centershaft;
- a radial flange on one end of the spool carrier;
- a spool on said spool carrier and having a surface facing said radial flange on said spool carrier;
- first drag means between said surface on the spool and said radial flange on said spool carrier;
- spring means between said abutment and said spool carrier;
- second drag means keyed on said spool carrier and engaging an opposite surface on said spool;
- a spool cap secured to said centershaft and bearing against said second drag means;

means acting between the tubular member and said centershaft for permitting limited relative axial movement therebetween and preventing relative rotatable movement therebetween;

an oscillator slider connected to said acting means and connected to said crankshaft whereby rotation of the crankshaft oscillates the slider, the tubular member and the centershaft;

a drag-adjusting knob rotatably supported on the rear wall of the housing and encircling the rear end portions of the centershaft and of the tubular member; and means threaded on the end portion of the centershaft and engaging the end of said tubular member, said threaded means having means coacting with said drag-adjusting knob for permitting relative sliding movement between the threaded means and the drag-adjusting knob, said coacting means locking said threaded means for rotation with said drag-adjusting knob whereby turning said knob in one direction will increase the drag pressure on the spool and turning the knob in the other direction will decrease the drag pressure on the spool.

8. In a spinning reel for fishing having a housing, a wall on said housing through which a cylindrical member is rotatably extended, a pinion gear affixed to one end of said cylindrical member with the other end being attached to a rotor, a crankshaft in the housing, a crank exterior of the housing connected to the crankshaft, and a face gear on said crankshaft drivingly engaging said pinion gear for rotating the rotor, the improvement comprising:

concentric first and second shafts extending through said cylindrical member and projecting forward of said rotor;

an abutment fixed on the forward end of one of said first and second shafts;

a drag-adjusting knob rotatably supported on the rear of said housing and encircling the rear end portions of the first and second shafts;

means threaded on the rear end portion of the other of said first and second shafts and engaging the rear end of one of said first and second shafts, said threaded means coacting with said drag-adjusting knob to permit axial movement of the threaded means and the concentric first and second shafts relative to the knob while preventing relative rotational movement between the threaded means and the knob;

means acting between said first and second shafts for preventing relative rotation therebetween while permitting limited relative axial movement therebetween;

an oscillator slider operatively connected to said acting means and to said crankshaft whereby rotation of said crankshaft oscillates the slider and the first and second shafts;

a spool carried by and freely rotatable relative to the front end portion of said other of said first and second shafts, said spool having spaced side flanges with one flange facing said abutment on the one of said first and second shafts;

drag means carried by said other of said first and second shafts and engaging at least one of said side flanges;

a spool cap secured to said other of said first and second shafts and facing the other of said side flanges on the spool for retaining said spool and drag means on said other of said first and second shafts; and resilient means acting between the first and second shafts for urging the drag means against said spool whereby turning the drag knob in one direction will shift one of the first and second shafts axially relative to the other to shorten the distance between the spool cap and the abutment, thereby increasing the pressure of the resilient means against the drag means and spool to increase the drag on the spool and turning the drag knob in the other direction will enlarge the distance between the spool cap and the abutment to decrease the drag on the spool 9. In a spinning reel as claimed in claim 8 wherein said first shaft is a centershaft and said second shaft is a tubular shaft concentrically disposed with respect to said centershaft.

10. In a spinning reel as claimed in claim 9 wherein said abutment means is affixed to said tubular shaft and said spool cap is secured to said centershaft.

11. In a spinning reel as claimed in claim 10 wherein a spool carrier having one radial flange is keyed to the centershaft so as to rotate with the centershaft and so as to be free to slide axially relatively to the centershaft, said spool being mounted on said spool carrier for free rotation relative to said spool carrier.

12. In a spinning reel as claimed in claim 11 wherein said drag means comprises a first drag disc and drag ring between said one side flange on the spool and the flange on the spool carrier with a second drag stack between the spool cap and the other side flange of the spool.

13. In a spinning reel as claimed in claim 12 wherein said resilient means is a compression spring encircling the centershaft and bearing between the abutment on the tubular shaft and the spool carrier to urge the spool carrier flange against the drag disc and the spool so that turning the drag knob in one direction draws the centershaft and spool cap toward the abutment to increase drag pressure on the spool, and turning the drag knob in the opposite direction moves the centershaft and spool cap away from the abutment and tubular shaft to decrease drag pressure on the spool.

14. In a spinning reel as claimed in claim 13 wherein said threaded means is a threaded nut having a spline on the outer surface to permit the nut to slide axially in the drag knob and to rotate with the drag knob.

* * * * *